Patented July 9, 1929.

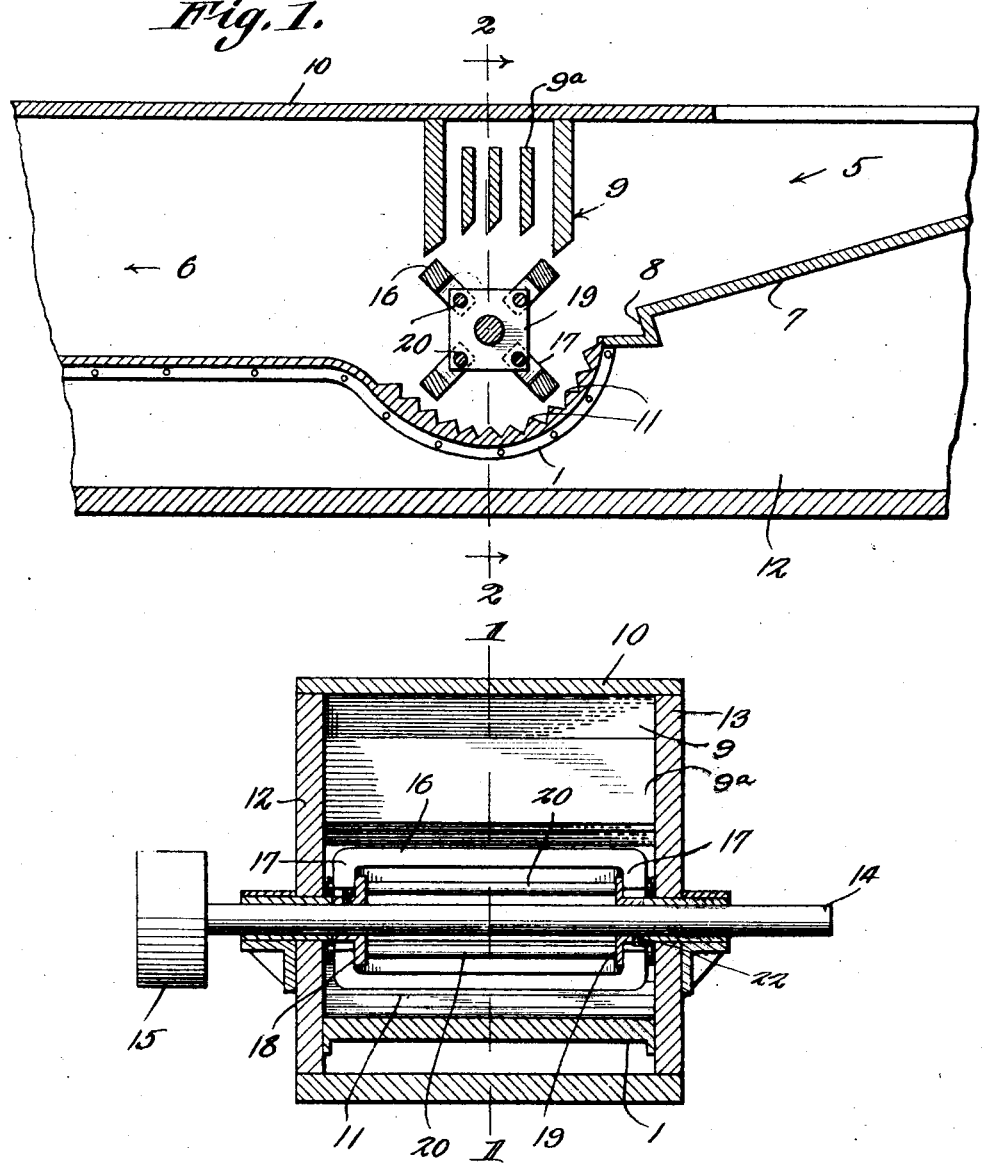

1,720,618

UNITED STATES PATENT OFFICE.

CHARLES E. WYMAN, OF PEKIN, INDIANA.

GRAIN SEPARATOR.

Application filed May 26, 1925. Serial No. 32,993.

The object of the invention is to provide a novel combined baffle and concave mechanism for a separator.

In the accompanying drawings:—

Figure 1 represents a transverse vertical section taken on the line 1—1 of Fig. 2; and Figure 2 is a longitudinal section taken on the line 2—2 of Fig. 1.

This separator comprises a box-like trunk wherein is located a concave 1 made with corrugations 11, the concave being attached at its ends to upright supports or sides 12 and 13 wherein a shaft 14 is journaled, a pulley 15 constituting means for rotating the shaft.

The inlet is shown at 5 and the outlet at 6. The inlet 5 has a downwardly and inwardly inclined floor 7 which adjacent to its junction with concave 1 is provided with a shoulder 8. Baffles 9$^a$ extend between the supports 12 and 13 and are spaced at their upper edges from the top 9. The baffles 9$^a$ are located between baffles 9 depending from the top 10 all of the baffles being located over the beaters 16, thereby to prevent said beaters from forcing air and dust out of the concave and into the inlet 5 during the operation of the machine.

The beaters 16 are heavy U-shaped members which extend substantially the full length of the concave 1. By means of rods 20, arms 17 of these beaters are pivotally connected at their free ends to plates 18 and 19 secured to the shaft 14 by set screws 22.

Both the baffle plates 9$^a$ and the baffle plates 9 which depend from the top 10 of the cylinder, have their lower ends beveled to form edges located in the arc of a circle, so that these baffles form substantially a concave to cooperate with the concave 1. The specific arrangement of the parts 9 and 9$^a$ is peculiarly effective to prevent air and dust from being forced into the inlet 5 when the beaters are in operation.

I claim:—

In a device of the class described, a trunk including a top and sides, baffles extending downwardly from the top and extended between the sides, other baffles extended between the sides and having their upper edges spaced from the top, a concave extended between the sides and located below the baffles, and a rotary beater journalled in the trunk, and located directly between the baffles and the cancave, the beater including rectangular plates and U-shaped members having arms which are pivoted to the outer sides of the plates at the corners thereof, the length of the arms being such that each U-shaped member can strike the edges of the plate without hitting an adjoining U-shaped member.

In testimony that I claim the foregoing as my own, I have hereto affixed my signature.

CHARLES E. WYMAN.